United States Patent

Cyba

[15] 3,644,217

[45] Feb. 22, 1972

[54] SYNERGISTIC MIXTURE AND USE THEREOF

[72] Inventor: Henryk A. Cyba, Evanston, Ill.

[73] Assignee: Universal Oil Products Company, Des Plaines, Ill.

[22] Filed: Dec. 2, 1968

[21] Appl. No.: 780,584

[52] U.S. Cl. ............................. 252/400, 252/404, 252/407, 260/45.7 R, 260/462 R
[51] Int. Cl. ................ C08c 13/08, C08d 11/04, C08f 45/58
[58] Field of Search .................... 252/403, 400, 33.6 R, 407, 252/404; 260/45.7 R, 46.2 R

[56] References Cited

UNITED STATES PATENTS

| | | | |
|---|---|---|---|
| 3,177,267 | 4/1965 | Luvisi | 260/45.7 |
| 3,322,719 | 5/1967 | Peilstoelcer | 260/45.7 |

FOREIGN PATENTS OR APPLICATIONS

| | | | |
|---|---|---|---|
| 1,097,959 | 1/1968 | Great Britain | 260/45.8 |

*Primary Examiner*—Richard D. Lovering
*Assistant Examiner*—Irwin Gluck
*Attorney*—James R. Hoatson, Jr. and Bernard L. Kramer

[57] ABSTRACT

Synergistic mixture of a boron compound devoid of nitrogen and at least one of a hydroxyphenone, an N-hydroxyphenyl-benzotriazole and a salicylic acid ester. The mixture is used as an additive to stabilize plastic, resins and fibers against deterioration due to weathering, oxidation, heat, etc.

9 Claims, No Drawings

SYNERGISTIC MIXTURE AND USE THEREOF

BACKGROUND OF THE INVENTION

I have heretofore disclosed the use of borates of certain alkanolamines as additives in plastic to inhibit deterioration of the plastic due to weathering, oxidation, heat, etc. I also have heretofore disclosed the use of the borates of certain alkanolamines in admixture with certain other additives which effects a synergistic activity in the stabilization of plastic. In such prior disclosures, the borates were of compounds containing nitrogen as an essential element.

DESCRIPTION OF THE INVENTION

The present invention is directed to synergistic mixtures containing, as an essential component, a boron compound devoid of nitrogen. These boron compounds in conjunction with the other compounds herein set forth produce a synergistic mixture which imparts high stability qualities to the substrate.

In one embodiment, the present invention comprises a synergistic mixture of a boron compound devoid of nitrogen and at least one of a hydroxyphenone, an N-hydroxyphenylbenzotriazole and a salicylic acid ester.

Any suitable boron compound devoid of nitrogen is used as one component of the synergistic mixture. The boron compound may be represented by the formula B—(OR)$_3$, R—B—(OR)$_2$, R$_2$—B—OR or R$_3$—B, where R is selected from hydrogen except in the case of R$_3$—B, alkyl, aralkyl, aryl, alkaryl, cycloalkyl, alkcycloalkyl and cycloalkalkyl, which may in turn be substituted with nonnitrogen-containing groups such as alkoxy, thioalkoxy, halogen, etc., or R may comprise carbon atoms of the same or different cyclic structure.

In one embodiment, the boron compound is boric acid or boric oxide. In a preferred embodiment, the boron compound is a trialkyl borate in which each alkyl contains from one to 40, preferably one to 20, carbon atoms. Illustrative borates in this embodiment include trimethyl borate, triethyl borate, triporpyl borate, tributyl borate, tripentyl borate, trihexyl borate, triheptyl borate, trioctyl borate, trinonyl borate, tridecyl borate, triundecyl borate, tridodecyl borate, tritridecyl borate, tritetradecyl borate, tripentadecyl borate, trihexadecyl borate, triheptadecyl borate, trioctadecyl borate, trinonadecyl borate, trieicosyl borate, etc., in which the alkyl group preferably is of straight chain but also may be of branched chain. A number of these borates are available commercially as "Borester 1" (triethyl borate), "Borester 2" (tri-n-butyl-borate), as well as trimethyl borate, tri-n-amyl borate, tri-n-hexyl borate, tri-n-octyl borate, and tri-n-dodecyl borate. When R in the above formula is aralkyl, illustrative borates include tribenzyl borate, triphenethyl borate, triphenpropyl borate, triphenbutyl borate, etc.

When R in the above formula is aryl or alkaryl, illustrative boron compounds include triphenyl borate, tritolyl borate (tricresyl borate), trixylyl borate, triethylphenyl borate, tripropylphenyl borate, tributylphenyl borate, etc., as well as those containing two or three alkyl groups, preferably of from one to 10 carbon atoms each, attached to each phenyl group. It is understood that the corresponding naphthyl and anthracyl derivatives may be used.

Where R in the above formula is cycloalkyl, illustrative boron compounds include tricyclopropyl borate, tricyclobutyl borate, tricyclopentyl borate, tricyclohexyl borate, tricycloheptyl borate, tricyclooctyl borate, tricyclononyl borate, tricyclodecyl borate, tricycloundecyl borate, tricyclododecyl borate, or these compounds containing one to three alkyl groups of from one to 12 carbon atoms each or aryl or cycloalkyl group attached to each cyclic ring. A commercially available borate in this embodiment is tri-(2-cyclohexyl-cyclohexyl)-borate.

The above boron compounds are those of the formula B-(OR)$_3$ in which R is the same substituent. In another embodiment, all of the R groups are not the same. For example, one or two of the R groups may be alkyl of from one to six carbon atoms and the remaining R group or groups may be alkyl of seven to 40 carbon atoms. In still another embodiment, one or two of the R groups may be alkyl and the remaining R group may be of cyclic structure. Illustrative compounds in the last mentioned embodiment include phenyl-dialkyl borate or diphenylalkyl borate in which the alkyl contains from one to 40 carbon atoms. A particularly preferred compound in this embodiment is 2,6-di-tert-butyl-4-methylphenyl-di-n-butyl borate. Other illustrative compounds in this embodiment include 2,4-dimethyl-6-tert-butyl-di-n-alkyl borate in which each alkyl contains from one to 12 carbon atoms. Still other mixed borates include cyclohexyldialkyl and dicyclohexylalkyl borates in which the alkyl contains from one to 12 carbon atoms.

As hereinbefore set forth, two of the R groups may form a cyclic structure. An illustrative compound in this embodiment is tri-hexylene glycol biborate which is available commercially as "Borester 7." As hereinbefore set forth, the boron compound may form a cyclic ring with two different cyclic rings as, for example, in the borate of dihydroxydiphenyl sulfide, dihydroxydiphenyl ether, dihydroxyphenylmethane, dihydroxyphenylethane, dihydroxyphenylpropane, dihydroxyphenylbutane, etc., and particularly these compounds in which one or two alkyl groups of from one to 12 carbon atoms each are attached to each of the phenyl rings.

The compounds set forth above illustrate primarily those of the formula B—(OR)$_3$. Corresponding compounds of the formula R—B—(OR')$_2$, which are properly names as boronic acid derivatives or boronic esters, may be used in the synergistic mixture. These compounds will correspond to those set forth above except that one of the R groups will be bonded directly to the boron. Illustrative examples of these compounds include alkyl boronic acid in which the alkyl contains from one to 40 carbon atoms, phenyl boronic acid, alkylphenyl boronic acid, dialkylphenyl boronic acid, cyclohexyl boronic acid, alkylcyclohexyl boronic acid, dialkylcyclohexyl boronic acid, alkyldialkyl boronic acid as illustrated by R—B—(OR')$_2$ in which R is selected from alkyl, aryl, cycloalkyl and the two R' groups are the same or different groups selected from alkyl, aryl, or cycloalkyl. Illustrative compounds of the formula R—B—(OR')$_2$ include hexyl boronic acid, heptyl boronic acid, octyl boronic acid, nonyl boronic acid, decyl boronic acid, undecyl boronic acid, dodecyl boronic acid, dimethyldodecyl boronate, diethyldecyl boronate, dipropyloctyl boronate, dibutylbutyl boronate, etc. Additional illustrations include B-nonyl-bis-phenol sulfide, B-nonyl-bis-(octylphenol) sulfide, B-dodecyl-bis-(nonylphenol) sulfide, B-phenyl-bis-(t-butyl-phenol) sulfide, B-cyclohexyl-bis-(decylphenol) sulfide, B-octyl-bis-(octylphenol) ether, B-nonyl-bis-(t-butyl-phenol) ether, B-phenyl-bis-(nonylphenol) ether, B-cyclohexyl-bis-(isopropylphenol) ether, B-amyl-bis-(amylphenol) methane, B-octyl-bis-(t-butylphenol) methane, B-phenyl-bis-(octylphenol) methane, B-napthyl-bis-(methylphenol) methane, etc., corresponding diphenylethane derivatives, diphenylpropane derivatives, diphenylbutane derivatives, etc.

Boron esters of the formula R$_2$—B—OR are borinic acid derivatives or borinates. In these compounds each R group will be independently selected from those hereinbefore set forth. Illustrative examples include dimethyl borinate, diethyl borinate, dipropyl borinate, dibutyl borinate, dipentyl borinate, dihexyl borinate, diheptyl borinate, dioctyl borinate, dinonyl borinate, didecyl borinate, diundecyl borinate, didodecyl borinate, etc., diphenyl borinate, ditolyl borinate, dixylyl borinate, dicumyl borinate, etc., dibutyldecyl borinate, diamylnonyl borinate, dihexyloctyl borinate, didecylbutyl borinate, diphenylbutyl borinate, dinaphthylhexyl borinate, dicyclohexylhexyl borinate, dibutylphenyl borinate, didecylcyclohexyl borinate etc.

Still other borons containing compounds are trialkyl boranes of the following general structure R$_3$B, where R is alkyl of from about two to 40, preferably four to 20 carbon atoms, cycloalkyl, cyclohexyl being the preferred, aryl or alkaryl. Typical compounds are tri-n-butylborane, tri-iso-butylborane, tri-n-amylborane, tri-iso-amylborane, tridodecylborane, tripocta-decylborane, etc.

From the above description, it will be seen that the boron constituent of the boron component of the synergistic mixture may be selected from a large variety of boron compounds which are devoid of nitrogen. It is understood that the different boron compounds are not necessarily equivalent for use in the synergistic mixture.

The boron compounds may be obtained from any suitable source or prepared in any suitable manner. As hereinbefore set forth, a number of these boron compounds are available commercially. Preparation of various boron compounds are described in the literature and in patents, including, for example, U.S. Pat. Nos. 3,347,793, 3,393,130, 3,224,971, and 3,131,071 or British Pat. No. 1,080,178, etc.

As hereinbefore set forth, the boron compound forms a synergistic mixture with a hydroxyphenone, an N-hydroxyphenylbenzotriazole and/or a salicylic acid ester. Any suitable hydroxyphenone is used in the synergistic mixture. The hydroxyphenone is of the following structural formula:

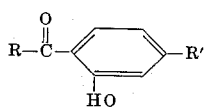

where R is selected from the group consisting of aryl, alkyl, alkylene and cycloalkyl and R' is selected from the group consisting of hydrogen, alkyl, alkylene, aryl, cycloalkyl, hydroxy, alkoxy, alkyleneoxy, aryloxy, cycloalkoxy, hydroxyalkyloxy and carboxyalkyloxy.

Where R is aryl, the hydroxyphenone is a hydroxybenzophenone. It is understood that the hydroxybenzophenone may contain one or a plurality of hydroxy groups and, in fact, a particularly preferred hydroxybenzophenone is 2,2'-dihydroxybenzophenone. Other hydroxybenzophenones include 2-hydroxybenzophenone, 2,3-dihydroxybenzophenone, 2,5-dihydroxybenzophenone, 2,6-dihydroxybenzopheone, 2,3,5-trihydroxybenzophenone, 2,3,5,6-tetrahydroxybenzophenone, 2,2',3,3'-tetrahydroxybenzophenone, 2,2',4,4'-tetrahydroxybenzophenone, 2,2',5,5'2,2',6,6'-tetrahydroxybenzophenone, 2,2'-dihydroxy-4,4'-dimethoxy-5-sulfobenzophenone and its sodium or potassium salt, etc.

Where R in the formula IV is aryl and R' is a substituent selected from those hereinbefore set forth, illustrative but not limiting examples of hydroxybenzophenones include 2-hydroxy-4-alkylbenzophenone in which the alkyl contains from one to 30 carbon atoms and preferably from one to 18 carbon atoms and thus is selected from methyl, ethyl, propyl, butyl, pentyl, hexyl, heptyl, octyl, nonyl, decyl, undecyl, dodecyl, etc., 2-hydroxy-4-cycloalkylbenzophenone in which the cycloalkyl contains from three to 12 carbon atoms in the cycloalkyl ring and preferably is cyclohexyl but may be cyclopropyl, cyclobutyl, cyclopentyl, cycloheptyl, cyclooctyl, cyclononyl, cyclodecyl, etc., 2-hydroxy-4-alkoxybenzophenone in which the alkoxy group contains from one to 20 carbon atoms and preferably three to 20 carbon atoms and thus is selected from propoxy, butoxy, pentoxy, hexoxy, heptoxy, octoxy, nonoxy, decoxy, undecoxy, dodecoxy, tridecoxy, tetradecoxy, pentadecoxy, hexadecoxy, heptadecoxy, octadecoxy, etc., 2-hydroxy-4-aryloxybenzophenone in which the aryloxy group is selected from phenoxy, toluoxy, xyloxy, etc., 2-hydroxy-4-cycloalkoxybenzophenone in which the cycloalkyl ring contains from three to 12 carbon atoms and is selected from cyclopropoxy, cyclobutoxy, cyclopentoxy, cyclohexoxy, cycloheptoxy, cyclooctoxy, cyclononoxy, cyclodecoxy, cycloundecoxy and cyclododecoxy, and similarly substituted compounds where two or more of the same or different groups selected from those set forth hereinbefore are attached to one or both of the phenyl rings. In addition, one of the aromatic rings may be substituted by carboxy group, sulfo group or halo group such as in the compounds 2-hydroxy-4-methoxy-2'-carboxybenzophenone or 2-hydroxy-4-methoxy-5-sulfobenzophenone trihydrate, or a polymerizable group such as in 2-hydroxy-4-(2-hydroxy-3methylacryloxy)-propoxy benzophenone, etc.

Where the hydroxybenzophenone contains a hydroxy group on each of the phenyl rings, the hydroxy groups preferably are in the position of 2,2'- and accordingly a preferred hydroxybenzophenone for use in the present invention is 2,2'-dihydroxybenzophenone. Illustrative but not limiting compounds in this embodiment of the invention include 2,2'-dihydroxy-4-alkylbenzophenone, 2,2'-dihydroxy-4,4'-dialkylbenzophenone, 2,2'-di-hydroxy-4-cycloalkylbenzophenone, 2,2'-dihydroxy-4,4'-dicycloalkylbenzophenone, 2,2'-dihydroxy-4-alkoxybenzophenone, 2,2'-dihydroxy-4,4'-dialkoxybenzophenone, 2,2'-dihydroxy-4-aryloxybenzophenone, 2,2'-dihydroxy-4,4'-diaryloxybenzophenone, 2,2'-dihydroxy-4-cycloalkoxybenzophenone and 2,2'-dihydroxy-4,4'-dicycloalkoxybenzophenone, in which these substituents are selected from those specifically hereinbefore set forth. Here again, it is understood that one or both of the phenyl rings may contain two or more of the same or different substituents selected from those set forth above.

Where R in formula IV is alkyl, illustrative hydroxyphenones include 2-hydroxyacetophenone, 2-hydroxypropiophenone, 2-hydroxybutyrophenone, 2-hydroxyvalerophenone, 2-hydroxycaprylophenone, 2hydroxylaurylphenone, 2-hydroxypalmitylphenone, etc. Here again it is understood that the phenyl ring may contain one or more of the substituents hereinbefore set forth and also that the alkyl moiety may contain one or more of the substituents hereinbefore set forth and also that the alkyl moiety contain one or more substituents attached thereto, these substituents preferably being selected from those hereinbefore specifically set forth. Where R in the above formula is cycloalkyl, the cycloalkyl preferably is cyclohexyl or it may be cyclopropyl, cyclobutyl, cyclopentyl, cycloheptyl, cyclooctyl, cyclononyl, cyclodecyl, cycloundecyl, cyclododecyl, etc. Here again the cycloalkyl ring may contain one or more of the substituents hereinbefore set forth. In addition, compounds which on exposure to light and/on heat rearrange to hydroxybenzophenones, such as resorcinol monobenzoate or hydroquinone dibenzoates are also believed to be synergistic with the boron derivatives enumerated above.

From the above description, it will be seen that various hydroxyphenones will be used in the synergistic mixture of the present invention. In another embodiment, these include hydroxyphenones which are an integral part of the polymer or are polymeric themselves as, for example, those described in U.S. Pat. Nos. 3,385,910 and 3,389,099 or in British Pat. Nos. 1,066,404, 990,312, etc. It is understood that the hydroxyphenones may be copolymerized or condensed with the resin, plastic rubber or other substrate to be protected. The hydroxyphenones generally are available in the open market or may be prepared by conventional means. It is understood that the different hydroxyphenones are not necessarily equivalent in their effectiveness in the mixture of the present invention.

The N-hydroxyphenyl-benzotriazole for use in the synergistic mixture of the present invention is illustrated by the following structural formula:

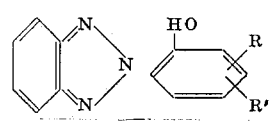

where R and R' are independently selected from hydrogen, alkyl of from one to 30 carbon atoms and alkoxy of from one to 30 carbon atoms.

Referring to formula V, where R is alkyl and R' is hydrogen, illustrative compounds include 2-(2'-hydroxy-5'-methylphenyl)-benzotriazole and corresponding compounds in which the methyl group is replaced by ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, eicosyl, etc. Additional examples of specific compounds include 2-(2'-hydroxy-5'-octylphenyl)-benzotriazole and 2-(2'-hydroxy-5'-dodecylphenyl)-benzotriazole. Other illustrative compounds include 2-(2'-hydroxy-3'-methylphenyl)-benzotriazole and corresponding compounds in which the methyl group is replaced by an alkyl group of from two to 30 carbon atoms and particularly a tertiary alkyl group such as tert-butyl, tert-amyl, etc. Other compounds include those in which the alkyl group is in the 4' or 6' position.

Where both R and R' are alkyl in formula V, illustrative compounds include 2-(2'-hydroxy-3',5'-dimethylphenyl)-benzotriazole and corresponding compounds in which one or both of the alkyl groups are replaced by alkyl groups containing from two to 30 carbon atoms. In particular, tertiary butyl groups are desirable substituents. Here again, it is understood that the alkyl groups may be in the positions 3', 4'; 3', 6'; 4', 5'; or 4', 6'.

Where R is alkoxy and R' is hydrogen in formula V, illustrative compounds include 2-(2'-hydroxy-5'-methoxyphenyl)-benzotriazole and corresponding compounds in which the methoxy group is replaced by an alkoxy group containing from two to 30 carbon atoms. Additional examples of specific compounds include 2-(2'-hydroxy-5'-methoxyphenyl)-benzotriazole and corresponding compounds in which the methoxy group is replaced by an alkoxy group containing from two to 30 carbon atoms. Additional examples of specific compounds include 2-(2'-hydroxy-5'-octoxyphenyl)-benzotriazole and 2-(2'-hydroxy-5'-dodecoxyphenyl)-benzotriazole. Here again, the alkoxy group may be in the 3', 5' or 6' position.

Where R is alkyl and R' is alkoxy in formula V, illustrative compounds include 2-(2'-hydroxy-3'-methoxy-4'methylphenyl)-benzotriazole, 2-(2'-hydroxy-3'-methoxy-4'-ethylphenyl)-benzotriazole, 2-(2'-hydroxy-3'-methoxy-4'-propylphenyl)-benzotriazole, 2-(2'-hydroxy-3'-methoxy-4'-tert-butylphenyl)-benzotriazole, 2-(2'-hydroxy-3'-methoxy-4'-tert-pentylphenyl)-benzotriazole, 2-(2'-hydroxy-3'-methoxy-4'-tert-hexylphenyl)-benzotriazole, 2-(2'-hydroxy-3'-methoxy-4'-tert-heptylphenyl)-benzotriazole, 2-(2'-hydroxy-3'-methoxy-4'-tert-octylphenyl)-benzotriazole, 2-(2'-hydroxy-3'-methoxy-4'-tert-nonylphenyl)-benzotriazole, 2-(2'-hydroxy-3'-methoxy-4'-tert-decylphenyl)-benzotriazole, 2-(2'-hydroxy-3'-methoxy-4'-tert-undecylphenyl)-benzotriazole, 2-(2'-hydroxy-3'-methoxy-4'-tert-dodecylphenyl)-benzotriazole, corresponding compounds in which the methoxy is replaced by alkoxy containing two to 30 carbon atoms, corresponding compounds in which the tert-alkyl groups are normal alkyl or secondary alkyl, corresponding compounds in which the alkyl and alkoxy groups, respectively are in the positions 3', 5'; 3', 6'; 4', 5'; 4', 6'; 4', 3'; 5', 3'; 5', 4'; 6', 3'; 6', 4'; or 6', 5'.

From the above description, it will be seen that various N-hydroxyphenyl-benzotriazoles may be used in the synergistic mixture of the present invention. Illustrative of various N-hydroxyphenyl-benzotriazoles are those disclosed in British Pat. Nos. 981,539, 991,320, 991,204 and 991,205. The N-hydroxyphenyl-benzotriazoles generally are available in the open market or may be prepared by conventional means. It is also understood that N-hydroxyphenyl-benzotriazole may be an integral part of the polymer or incorporated therein via polymerizable link. It is understood that the different N-hydroxyphenyl-benzotriazoles are not necessarily equivalent in their effectiveness in the mixture of the present invention.

Any suitable salicylic acid ester is used in the synergistic mixture of the present invention. Preferred esters are phenyl salicylate (Salol), p-alkylphenyl salicylates in which the alkyl contains from one to 30 carbon atoms including p-t-butylphenyl salicylate, p-t-octylphenyl salicylate or the corresponding n or sec-alkyl counterparts, polyalkylphenyl salicylates, in which each alkyl contains from one to 30 carbon atoms and salicylates in which the ester portion is derived from terpenic moieties, such as homoenthyl, carboxyphenylsalicylate, strontium, calcium or barium salicylates, etc. Here again, a number of these salicylic acid esters are available commercially or they may be prepared in any suitable manner. For example, phenol or substituted phenol is reacted with salicylic acid to form the ester. It is understood that the different salicylic acid esters are not necessarily equivalent in their use in the synergistic mixture of the present invention.

The synergistic mixture of the present invention comprises from about 10 percent to about 90 percent by weight of the boron compound and from about 10 percent to about 90 percent by weight of at least one of the hydroxyphenone, N-hydroxyphenylbenzotriazole and salicylic acid ester, exclusive of other ingredients included in the mixture. Generally, it is preferred that the boron compound is in a proportion of from about 50 percent to about 90 percent by weight and the other component set forth above is in a proportion of from about 10 percent to about 50 percent by weight.

While the synergistic mixture of the present invention is very effective, it is understood that the synergistic mixture may also contain one or more additional additives and more particularly at least one phenolic antioxidant. In one embodiment, the additional antioxidant is a trialkylphenol. A particularly preferred trialkylphenol is 2,6-di-tert-butyl-4-methylphenol known as BHT or butylated hydroxytoluene. Other trialkylphenols include 2,6-di-isopropyl-4-methylphenol, 2,6-diamyl-4-methylphenol, 2,6-dihexyl-4-methylphenol, 2,6-diheptyl-4-methylphenol, 2,6-dioctyl-4-methylphenol, 2,6-dinonyl-4-methylphenol, 2,6-didecyl-4-methylphenol, 2,6-diundecyl-4alkylphenol, 2,6-didodecyl-4-alkylphenol, 2,6-ditridecyl-4-alkylphenol 2,6-ditetradecyl-4-alkylphenol, 2,6-dipentadecyl-4-alkylphenol, 2,6-dihexadecyl-4-alkylphenol, 2,6-diheptadecyl-4alkylphenol, 2,6-dioctadecyl-4-alkylphenol, etc., 2,4-dimethyl-6-isopropylphenol, 2,4-dimethyl-6-tert-butylphenol, 2,4-dimethyl-6-pentylphenol, 2,4-dimethyl-6-hexylphenol, 2,4-dimethyl-6-heptylphenol, 2,4-dimethyl-6-octylphenol, 2,4-dimethyl-6-nonylphenol, 2,4-dimethyl-6-decylphenol, etc., 2,6-diethyl-4-alkylphenol, 2,6-dipropyl-4-alkylphenol, 2,6-dibutyl-4-alkylphenol, 2,6-diamyl-4-alkyphenol, 2,6-dihexyl-4-alkylphenol, etc., in which the alkyl contains from one to 20 or more carbon atoms. In one embodiment, the trialkylphenol will contain one or two alkyl groups containing four or less carbon atoms and one or two alkyl groups containing four or more carbon atoms, the latter preferably being of tertiary configuration. These trialkylphenols may be obtained in the open market or prepared in any suitable manner. Here again, it is understood that the different trialkylphenols are not necessarily equivalent in their use in the mixture of the present invention.

In another embodiment, the additional antioxidant is 1,1,3-tris-(2-methyl-4-hydroxy-5-tert-butylphenyl)-butane. This material is available commercially under the trade name of "-Topanol CA." Other related antioxidant compounds may be used and includes, for example, those in which the methyl group is replaced by hydrogen or alkyl of two to six carbon atoms and/or those in which the tert-butyl group is replaced by tert-pentyl, tert-hexyl, tert-heptyl, tert-octyl, tert-nonyl, tert-decyl and/or related compounds in which the butane moiety is replaced by pentane, hexane, heptane, octane, nonane, decane, etc. In another embodiment, this component of the mixture is 2,4-bis-(3,5-di-tert-butyl-4hydroxyphenyl)-butane. Here again, it is understood that the tert-butyl and/or butane moiety may be replaced by other alkyl groups. These compounds may be obtained in the open market or prepared in any suitable manner.

In another embodiment, the additional antioxidant is dilauryl-thiodipropionate. This compound is available commercially or may be prepared in any suitable manner. It is understood that other satisfactory antioxidants may be used and these include, for example, dicapryl-thiodipropionate, dimyristyl-thiodipropionate, dipalmityl-thiodipropionate, distearyl-thiodipropionate, etc. Still other antioxidants include dilauryl-beta-mercapto-dithiopropionate, distearyl-beta-mercapto-dithiopropionate, and other beta-mercapto-dithiopropionates.

In a particular preferred embodiment the additional antioxidant comprises both the 1,1,3-tris-(2-methyl-4-hydroxy5-tert-butylphenol)-butane and dilauryl-thiodipropionate. Here again, it is understood that a mixture of the corresponding compounds herein before set forth maybe used.

When desired, other additives may be included in the synergistic mixture. These may include one or more such other additives selected from phenyl-alpha-naphthylamine, phenyl-beta-naphthylamine, phenothiazine, diphenyl-p-phenylenediamine, 2,2'-methylene-bis-(4-methyl-6-tert-butylphenol), 2,2'-methylene-bis-(4-ethyl-6-tert-butylphenol), 4,4'-thio-bis-(6-tert-butyl-o-cresol), 2,6-bis-(2'-hydroxy-3'-tert-butyl-5'-methylbenzyl)-4-methylphenol,[2,2'-thio-bis-(4-tert-octyl-phenolato)]-n-butylamine nickel II, nickel-bis-dithio-carbamate. Other additives are unsubstituted and substituted organic phosphites such as aliphatic, aromatic, alicyclic, heterocyclic derivatives including tris-octyl or tris-nonylphenyl phosphites, trilauryl trithiophosphite, in general trialkyl trithiophosphites. In particular, polymeric phosphites are desired, especially those of reduced tendency to hydrolyses, such as

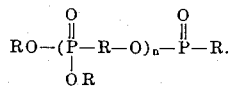

Also included are di-(neododecyl pentaerythritol)-diphosphite, neododecyl neopentylene phosphite, triethyleneglycol di-neopentyl diphosphite, as well as phosphites disclosed in U.S. patents 3,088,917, 3,080,338, 3,053,878, 3,047,608, 3,039,993, 3,009,939, 2,733,226 and 2,732,365.

Other additives are various tin containing compounds such as stannates, tetravalent tin derivatives such as dialkyl tin maleate or tin and sulfur containing compounds such as disclosed in British patents 1,110,709, 1,060,067 and 1,069,165, dibutyl tin di-(isooctyl thioglycolate), dioctyl tin di-(isooctyl thioglycolate), dibutyl tin di-(lauryl mercaptide), dibutyl tin mercaptide carboxylates, polyamine tin mercaptides, etc. Still other additives include various Irganoxes such as those disclosed in U.S. patents 3,255,191 and 3,330,859. In particular, the following Irganoxes are useful, 569,858, 1076, 1093 or 1010 which is a high molecular solid of the following formula: $C_{73}H_{108}O_{12}$, etc., various Ionoxes such as 1,3,5-trimethyl-2,4,6-tris-(3,5-di-tert-butyl-4-hydroxybenzyl)-benzene, 1,2,4,5-tetramethyl-3,6-bis-(3,5-di-tert-butyl-4-hydroxybenzyl)-benzene, etc., various Plastanoxes such as 2,6-bis-(2'-hydroxy-3'-tert-butyl-5'-methylbenzyl)-4-methylphenol; various phosgene alkylphenol reaction products, 2,4-dibenzoylresorcinol, resorcinol monobenzoate, hexamethylphosphoric triamide, phosphoric acid-N-methylamide-diamide, phosphoric acid-N,N,dimethylamidediamide, phosphoric acid-N,N-distearylamide-diamide, phosphoric acid-tri-(N,N-dimethylamide), phosphoric acid-tri-(N,N-dimethylamide, phosphoric acid-tri-(N-dodeocylamide), diphosphoric acid-di-(N-methyl-N-stearylamide), etc. Furthermore various 1,3,5-triazines may be used such as 6-(4-hydroxy-3,5-di-tert-butylanilino)-2,4-bis-(n-octylthio)-1,3,5-triazine or various other triazines as disclosed in British Pat. No. 994,922.

The additional phenolic antioxidant and, when used, the other additive will each be used in a concentration of from about 1 percent to about 50 percent by weight of the synergistic mixture although these may be used in higher concentrations which may be as high as 200 percent by weight of the boron compound.

The synergistic mixture will be used in a stabilizing concentration and in general will be within the range from about 0.001 to about 10 percent and more particularly from about 0.01 to about 2 percent by weight of the substrate.

As hereinbefore set forth, the synergistic mixture of the present invention is advantageously used as an additive to retard both ultraviolet light and oxidative deterioration, as well as the deterioration due to heat. In one embodiment, this mixture is used in solid polymers, including plastics, resins, fibers, etc. Illustrative plastics which are stabilized in accordance with the present invention include polyolefins and particularly polyethylene, polypropylene, polybutylene, mixed ethylene propylene polymers, mixed ethylene butylene polymers mixed propylene butylene polymers, mixed styrene ethylene polymers, mixed styrene propylene polymers, etc. The solid olefin polymers are used in many applications including electrical insulation, lightweight outdoor furniture, awnings, cover for greenhouses, etc.

In another embodiment, the polymers to be stabilized include those prepared from diolefinic monomers as, for example, polybutadiene, or those in which the diolefin or diolefins are reacted with monoolefin or monoolefins, including ABS (acrylonitrile-butadiene-styrene polymers).

Another plastic being used commercially on a large scale which is treated in the present invention is polystyrene. The polystyrenes are particularly useful in the manufacture of molded of machined articles which find application in such goods as windows, optical goods, automobile panels, molded household articles, etc.

Another class of plastics available commercially and which are tested in the present invention is broadly classed as vinyl resins and is derived from monomers such as vinyl acetate, vinylbutyrate, etc. Other vinyl-type resins which are stabilized in accordance with the present invention include polyvinyl alcohol and copolymers, copolymers of vinyl chloride with acrylonitrile, methacrylonitrile, alkyl acrylates, alkyl methacrylates, alkyl maleates, alkyl fumarates, polyvinyl butyral, etc., or mixtures thereof.

Other plastics being used commercially on a large scale which are stabilized according to the present invention are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), rayon, etc.

Still other plastics which are stabilized by the present invention are prepared from other monomers and are available commercially. Illustrative examples of such other solid polymers include polycarbonates, polyphenyl oxides (polyphenyl ethers), phenol-formaldehyde resins, acryloid plastics which are derived from methyl, ethyl and higher alkyl acrylates and methacrylates as monomers used in the polymerization. Other polymers for stabilization in the present invention include polyacetals, especially polyformaldehydes such as "Delrin" and "Celcon." Still other substrates include vinyl, acrylic, nitrocellulose based coatings; especially cellulose acetate, cellulose acetate butyrate, ethyl cellulose, etc. Still other substrates for stabilization in the present invention are polyesters, including linear or cross-linked, reinforced polyesters, laminate polyesters, etc., polyurethane resins, epoxy resins, various latexes, lacquers, alkyds, varnishes, polishes, stains, pigments, dyes, textile-finishing formulations, cosmetics such as creams, lotions, sprays, etc.

It is understood that the plastic or resin may be fabricated into any desired finished product including moldings, castings, fibers, films, sheets, rods, tubing, foams or other shapes.

Another organic substrate which undergoes deterioration due to oxidation and/or weathering is rubber, and the same is stabilized in accordance with the present invention. Rubber is composed of polymers of conjugated 1,3-dienes, either as polymers thereof or as copolymers thereof with other polymerizable compounds, and may be synthetically prepared or of natural origin. Synthetic rubbers include SBR rubber (copolymer of butadiene and styrene), EPR rubber (terpolymer of ethylene, propylene and a diene), Buna A (Copolymer of butadiene and acrylonitrile), butyl rubber (copolymer of butadiene and isobutylene), Thiokol rubber (polysulfide), silicone rubber, etc. Natural rubbers include hevea rubber, cautchouc, balata, guttapercha, etc.

Still other organic substrates which undergo deterioration due to oxidation and/or weathering include paints, varnishes, drying oils, pigments, rust-preventative coatings, other protective coatings, etc. These substrates also are stabilized in accordance with the present invention.

The components of the synergistic mixture of the present invention may be added separately to the plastic to be stabilized but preferably the synergistic mixture is first formed by commingling the components, with or without other additives, and then incorporating the mixture in the plastic. When desired, the mixture or the individual components may be utilized as such or prepared as a solution in a suitable solvent. The additives are incorporated in the plastic in any suitable manner, including adding the same to the hotmelt, generally in a Banbury mixer, extruder or other device.

The following examples are introduced to illustrate further the novelty and utility of the present invention but not with the intention of unduly limiting the same.

EXAMPLE I

This example describes the use of a synergistic mixture of the present invention in solid polypropylene. One method of evaluating the effect of weathering is to expose the samples to carbon arc rays in a Fadometer. The polypropylene samples are milled in a two-roll mill of conventional design and the additive, when employed, is incorporated in the sample during the milling. The samples are pressed into sheets of about 17 ml. thickness and cut into plaques of about 1⅜×1½. The plaques are inserted into plastic holders, affixed onto a rotating drum and exposed to the carbon arc rays at about 125° F. in the fadometer. The samples are examined periodically by infrared analysis to determine the carbonyl band at 1,715 cm. which is reported as the "carbonyl number." The higher intensity of the carbonyl band indicates a higher carbonyl concentration (expressed as carbonyl number) and, accordingly, increased deterioration.

A sample of the polypropylene without additive developed a carbonyl number of greater than 1,000 within 120 hours of exposure in the fadometer. Another sample of the same polypropylene containing 0.15 percent by weight of butylated hydroxytoluene (2,6-di-tert-butyl-4-methylphenol) also developed a carbonyl number of over 1,000 within 120 hours of exposure in the fadometer. Still another sample of the polypropylene was prepared to contain 1 percent by weight of tri-m, p-cresyl borate, available commercially as "Borester 8," and 0.15 percent by weight of butylated hydroxytoluene. This sample reached a carbonyl number of over 1,000 within 200 hours of exposure in the fadometer. In contrast to the above, another sample of the polypropylene is prepared to contain 0.5 percent by weight of the tri-m, p-cresyl borate, 0.5 percent by weight of 2-hydroxy-4-octoxy-benzophenone, available commercially as "Cyanosorb 531," and 0.15 percent by weight of butylated hydroxytoluene. These components are incorporated into the polypropylene by milling at a temperature of 375° F. for 5 minutes. After 480 hours of exposure in the fadometer, the carbonyl number is below 400.

The different samples mentioned above also are evaluated for percent elongation after exposure in the fadometer. It is apparent that a higher percent elongation after exposure in the fadometer is indicative of the potency of the additive to stabilize the polypropylene. The sample of the polypropylene containing 1 percent by weight of 2-hydroxy-4-octoxy-benzophenone and 0.15 percent by weight of butylated hydroxytoluene had an elongation of only 9 percent after 480 hours of exposure in the fadometer. In contrast, the sample of polypropylene containing the synergistic mixture of 0.5 percent by weight of tri-m, p-cresyl borate, 0.5 percent by weight of 2-hydroxy-4-octoxy-benzophenone and 0.15 percent by weight of butylated hydroxytoluene has an elongation of greater than 200 percent after 480 hours of exposure in the fadometer.

The antioxidant potency of additives is determined in a method similar to that described by Hawkins, Hansen, Matreyek and Winslow in Rubber Chemistry and Technology, Oct.–Nov., 1959, pp. 1,164–1,170, except that an electrically heated aluminum block rather than an oven was used to maintain the desired temperature. The oxygen absorption of the sample was determined manometrically rather than volumetrically. In this method samples of the polypropylene, weighing about 0.5 grams each, are placed in separated 8-mm. glass tubes and the tubes then are inserted into horizontal rows of openings located concentrically around the heater. The temperature is maintained at about 284° F. The glass tubing also is packed with glass wool and molecular sieve to absorb the gases. Each of the glass tubes is connected to an individual manometer containing mercury, and the differential pressure is periodically determined. The induction period is taken as the number of hours required to reach a pressure differential of 20 cm. Hg.

A control sample (not containing the additive) of the polypropylene has an induction period of less than 2 hours. Another sample of the polypropylene containing 1 percent by weight of tri-m, p-cresyl borate and 0.15 percent by weight of butylated hydroxytoluene has an induction period of below 100 hours. Another sample of the polypropylene containing 1 percent by weight of 2-hydroxy-4-octoxy-benzophenone and 0.15 percent by weight of butylated hydroxytoluene has an induction period of about 3 hours. In contrast, another sample of the polypropylene containing the synergistic mixture of 0.5 percent by weight of tri-m, p-cresyl borate, 0.5 percent by weight of 2-hydroxy-4-octoxy-benzophenone and 0.15 percent by weight of butylated hydroxytoluene has an induction period of greater than 1,000 hours.

EXAMPLE II

In this example 1 percent by weight of 2,6-di-tert-butyl-4-methylphenyl-di-n-butylborate, available commercially as "Borester 30," was milled into another sample of the polypropylene and in the same manner as described in example I. When evaluated in the fadometer in the same manner as described in example I, this sample of the polypropylene developed a carbonyl value of 508 after 384 hours and a carbonyl value of about 1,000 after 576 hours. In another evaluation, 1 percent by weight of p-octylphenyl salicylate was milled into another sample of the polypropylene and, when evaluated in the fadometer, developed a carbonyl number of above 1,000 after 120 hours of exposure. This demonstrates that the p-octylphenyl salicylate is ineffective as a weathering stabilizer in polypropylene. In contrast to the above, another sample of the polypropylene containing the synergistic mixture of 0.5 percent by weight of "Borester 30," 0.5 percent by weight of p-octylphenyl salicylate and 0.15 percent by weight of butylated hydroxytoluene does not develop a carbonyl value of 1,000 in more than 1,000 hours of exposure in the fadometer. As shown in other examples, butylated hydroxytoluene, even in admixture with only the borate, was of only mild effectiveness to prolong the carbonyl value of the polypropylene.

EXAMPLE III

Additional evaluations were made of other samples of the polypropylene containing various additives. In one evaluation, the polypropylene was prepared to contain 1 percent by weight of tri-n-butyl borate, available commercially as "Borester 2," and 0.15 percent by weight of butylated hydroxytoluene. This sample of the polypropylene developed a carbonyl value of over 1,000 after only 192 hours of exposure in the fadometer. Another sample of the polypropylene containing "Borester 2" and butylated hydroxytoluene was exposed outdoors on Jan. 11 and by May 10 (119 days) developed a carbonyl value of over 1,000. The outdoor exposure was conducted by cutting the samples of the polypropylene into plaques and exposing the same to weathering on an outdoor rack facing south and inclined at a 45° angle at Des Plaines, Illinois. Another polypropylene sample was prepared to contain 1 percent by weight of 2,2'-dihydroxy-4-octoxy-benzophenone ("Stabilizer 314") and 0.15 percent by weight of a phenolic antioxidant. The phenolic antioxidant used in this and the following preparations of this example is 3,3'-dimethyl-5,5'-di-tert-butyl-4,4'-dihydroxydiphenylmethane, available commercially as "Ethyl 720." This sample was placed outdoors on June 21 and after 341 days, the carbonyl value increased to 611. Still another sample of the polypropylene was prepared to contain 0.5 percent by weight of "Stabilizer 314" and 0.15 percent by weight of the phenolic antioxidant and was placed outdoors on June 21. After 119 days of outdoor exposure, the carbonyl value increased to 588. In contrast to the above, another sample of the polypropylene containing the synergistic mixture of 0.5 percent of weight of "Borester 2," 0.5 percent by weight of "Stabilizer 314" and 0.15 percent by weight of the phenolic antioxidant does not reach a carbonyl value of 500 for a longer period of exposure outdoors. Also this composition when evaluated in the oxygen absorption method described in example I, has an induction period of over 1,000 hours.

EXAMPLE IV

This example describes the use of a synergistic mixture of the present invention in commercial polystyrene. The commercial polystyrene apparently contained an inhibitor because, when evaluated by the oxygen absorption method described in example I, the sample had an induction period of about 775 hours. Another sample of the polystyrene was prepared to contain 0.5 percent by weight of B-nonyl-bis-(octylphenol) sulfide which is of the following structure:

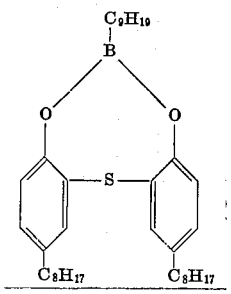

The above sample had an induction period of about 1,400 hours. In contrast another sample of the polystyrene containing the synergistic mixture of 0.25 percent by weight of the above bis-phenol-sulfide borate and 0.125 percent by weight of 2,2'-dihydroxy-4-methoxy-benzophenone available commercially as "Stabilizer 24" has an induction period in excess of 2,500 hours.

EXAMPLE V

The boron compound of this example for use in the synergistic mixture is a borate of 2-2'-dihydroxy-3-3'-di-tert-butyl-5-5'

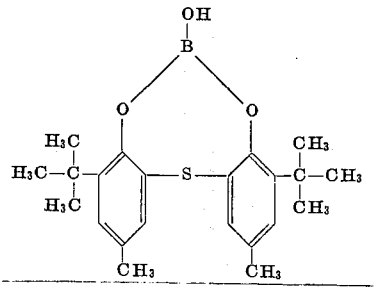

The synergistic mixture of 0.5 percent by weight of the above borate, 0.5 percent by weight of 2-hydroxy-5-methyl-benzotriazole, available commercially as "Tinuvin P," and 1 percent by weight of trioctylphenyl phosphite are milled for 5 minutes into commercial ABS (acrylonitrile-butadiene-styrene). The samples are exposed in the fadometer in the manner described in example I. After exposure for a designated time, the samples of the ABS are evaluated for yield value. The blank or control sample of the ABS decreased from the original yield value of 5,524 to 1,576 p.s.i. after 120 hours of exposure in the fadometer. The sample of ABS containing the synergistic mixture described above retains a yield value of at least 2,000 p.s.i. for more than 240 hours of exposure in the fadometer. The synergistic effect also is observed when samples of the ABS are evaluated according to the oxygen absorption method described in example I.

EXAMPLE VI

The boron compound in the synergistic mixture of this example is tert-butylcatechol borate of the following structure:

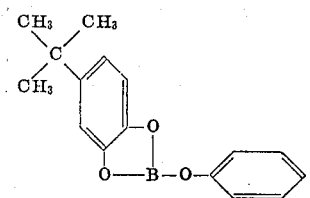

A synergistic mixture of 0.25 percent by weight of the above borate and 0.25 percent by weight of 2-hydroxy-3-tert-butyl-5-methylbenzotriazole, available commercially as "Tinuvin 326," is added to a solution of a polyester composed of 60 percent by weight of an ethylene terephthalate copolymer and 40 percent by weight of ethylene sebacate copolymer in carbon tetrachloride. The solution is evaporated, forming a film, which is heat set between two sheets of 5-mil thickness of polyethylene terephthalate. The resulting polyester product does not undergo appreciable change in percent elongation after 1,000 hours of exposure in the fadometer.

EXAMPLE VII

In this example, a synergistic mixture of 0.5 percent by weight of 2-6-di-tert-butyl-4-methylphenyl di-n-butyl borate ("Borester 30") is incorporated in polycaproamide and then is powdered with 0.5 percent by weight of 2-(2-hydroxy-5-methylphenyl)-benzotriazole ("Tinuvin P"). The mixture is spun into fibers and the fibers are heated in air at a temperature of about 300° F. A control sample of the fiber (not containing the additive) loses 40 percent of the initial breaking strength in about 7 hours. In contrast the sample of the fiber containing the synergistic mixture described above shows a loss in breaking strength of less than 10 percent after 100 hours of heating in air at about 300° F. Other synergistic mixtures are prepared by combining the reaction product of boric acid and dibutyl tin dichloride, such as disclosed in German Pat. No. 1,007,327 or British Pat. No. 1,080,178 with hydroxybenzophenones such as disclosed in U.S. Pat. Nos. 2,807,605, 2,943,076 or 3,001,970.

EXAMPLE VIII

In this example a commercial polyformaldehyde is compounded with 2 percent of a commercial polyamide (polyamide No. 54), 0.25 percent by weight of tri (2-cyclohexyl-cyclohexyl) borate, which is available commercially, and 0.25 percent by weight of 2-hydroxy-4-methoxy-benzophenone. The resultant polymer is evaluated at an oxygen pressure of 200 mm. Hg at 392° F. (200° C). The change in pressure, in mm. Hg is noted. An increase in the differential pressure indicates that depolymerization and oxidation are occuring. At these conditions enough gas is emitted from a control sample of the polymer (not containing the additive) after 80 minutes to raise the differential pressure to 320 mm. Hg. In contrast, a sample of the polymer containing the synergistic mixture described above shows a differential pressure of only 50 mm. Hg after more than 200 minutes. EXAMPLE IX The boron compound of this example is tris-(beta-ethylthioethyl) borate and is prepared by reacting boric acid with ethylthioethanol. A commercial polypropylene was used as the substrate, to which 1 percent by weight of tris-(beta-ethylthioethyl) borate and 0.15 percent by weight of butylated hydroxy toluene were incorporated by milling. The sample of the polypropylene containing these additives was evaluated in the fadometer. After 360 hours of exposure, the carbonyl value was 565 and after 480 hours it was above 1,000. In contrast, another sample of the polypropylene is prepared to contain 0.5 percent by weight of the tris-(beta-ethylthioethyl) borate and 0.25 percent by weight of 2-hydroxy-4-octoxy-benzophenone. This sample does not reach a carbonyl value of 565 in more than 1,000 hours of exposure in the fadometer.

Another sample of the polypropylene is prepared to contain 0.5 percent by weight of a synergistic mixture consisting of 0.25 percent by weight of tris-(tert-butylphenyl-thioethyl) borate and 0.25 percent by weight of 2-hydroxy-4-octoxy-benzophenone. This sample is evaluated at 284° F. in the oxygen absorption method described in example I and the induction period is in excess of 1,000 hours.

I claim as my invention:

1. Synergistic mixture of from about 10 percent to about 90 percent by weight of a boron compound devoid of nitrogen and from about 10 percent to about 90 percent by weight of a hydroxyphenone, said boron compound having the formula $B-(OR)_3$ where R is independently selected from the group consisting of hydrogen, alkyl, aralkyl, aryl, alkaryl, cycloalkyl, alkycloalkyl and cycloalkylalkyl; and said hydroxyphenone having the formula:

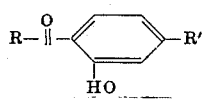

where R is selected from the group consisting of alkyl, alkylene, aryl and cycloalkyl, and R' is selected from the group consisting of hydrogen, alkyl, alkylene, aryl, cycloalkyl, hydroxy, alkoxy, alkyleneoxy, aryloxy, cycloalkoxy, hydroxyalkyloxy and carboxyalkyloxy.

2. The mixture of claim 1 in which said boron compound is a tri-alkyl borate in which each alkyl contains from one to 40 carbon atoms.

3. The mixture of claim 1 in which said boron compound is a tri-alkylphenyl borate in which the alkyl contains from one to 10 carbon atoms.

4. The mixture of claim 1 in which said boron compound is a mixed alkylphenyl-alkyl borate.

5. The mixture of claim 1 in which said boron compound is a tri-cycloalkyl borate.

6. The mixture of claim 1 also containing at least one phenolic antioxidant.

7. The mixture of claim 6 in which the antioxidant is selected from the group consisting of tri-alkylphenol, 1-1-3-tris-(2-methoxy-4-hydroxy-5-tert-butylphenol) butane, dilauryl-thiodipropionate, and mixtures thereof.

8. Solid polymer normally subject to deterioration upon weathering containing, as an additive against said weathering, the synergistic mixture of claim 1.

9. The polymer of claim 8 containing the synergistic mixture of claim 8.

* * * * *